United States Patent
Amershi et al.

(10) Patent No.: US 9,766,922 B2
(45) Date of Patent: Sep. 19, 2017

(54) AUTOMATED WEB TASK PROCEDURES BASED ON AN ANALYSIS OF ACTIONS IN WEB BROWSING HISTORY LOGS

(71) Applicant: International Business Machines Corporation, Armonk, NY (US)

(72) Inventors: Saleema A. Amershi, Seattle, WA (US); Tessa A. Lau, Mountain View, CA (US); Jalal U. Mahmud, San Jose, CA (US); Jeffrey W. Nichols, San Jose, CA (US)

(73) Assignee: INTERNATIONAL BUSINESS MACHINES CORPORATION, Armonk, NY (US)

(*) Notice: Subject to any disclaimer, the term of this patent is extended or adjusted under 35 U.S.C. 154(b) by 417 days.

(21) Appl. No.: 14/027,909

(22) Filed: Sep. 16, 2013

(65) Prior Publication Data

US 2014/0019979 A1 Jan. 16, 2014

Related U.S. Application Data

(63) Continuation of application No. 13/222,083, filed on Aug. 31, 2011, now abandoned.

(51) Int. Cl.
*G06F 9/46* (2006.01)
*G06F 17/30* (2006.01)
(Continued)

(52) U.S. Cl.
CPC .............. *G06F 9/46* (2013.01); *G06F 11/34* (2013.01); *G06F 11/3438* (2013.01);
(Continued)

(58) Field of Classification Search
None
See application file for complete search history.

(56) References Cited

U.S. PATENT DOCUMENTS 7,016,936 B2 3/2006 Wilkinson et al.
7,565,346 B2* 7/2009 Fan et al.
(Continued)

FOREIGN PATENT DOCUMENTS

WO 2010140160 A2 12/2010

OTHER PUBLICATIONS

Dalvi, et al.; "A Method of Performing Structural Clustering Of Web Pages"; IP.com No. IPCOM000206554D; p. 1-6; Apr. 29, 2011.

IBM Technical Disclosure Bulletin; "System and Technique for Automatically Detecting a Distributed Component Structure of Web Based Documents Using a Cluster Crawler Analyzer"; IP.com No. IPCOM000014891D; p. 1-9; Jun. 1, 2002.

(Continued)

*Primary Examiner* — Abu Ghaffari
*Assistant Examiner* — Caroline H Arcos
(74) *Attorney, Agent, or Firm* — Cantor Colburn LLP

(57) ABSTRACT

Embodiments of the invention relate to generating automated web task procedures from an analysis of web history logs. One aspect of the invention concerns a method that comprises identifying sequences of related web actions from a web log, grouping each set of similar web actions into an action class, and mapping the sequences of related web actions into sequences of action classes. The method further clusters each group of similar sequences of action classes into a cluster, wherein relationships among the action classes in the cluster are represented by a state machine, and generates automated web task procedures from the state machine.

4 Claims, 8 Drawing Sheets

(51) Int. Cl.
  *G06F 11/34* (2006.01)
  *G06F 9/44* (2006.01)

(52) U.S. Cl.
  CPC .......... *G06F 9/444* (2013.01); *G06F 11/3476* (2013.01); *G06F 17/30395* (2013.01); *G06F 17/30536* (2013.01); *G06F 17/30675* (2013.01); *G06F 17/30864* (2013.01); *G06F 17/30876* (2013.01)

(56) References Cited

U.S. PATENT DOCUMENTS

| | | | |
|---|---|---|---|
| 2007/0239762 A1 | 10/2007 | Farahbod | |
| 2008/0091663 A1 | 4/2008 | Inala et al. | |
| 2010/0198768 A1 | 8/2010 | Zhou et al. | |
| 2012/0198342 A1* | 8/2012 | Mahmud | 715/733 |
| 2013/0031075 A1* | 1/2013 | El Daher et al. | 707/706 |
| 2013/0167116 A1* | 6/2013 | Mahmud | 717/120 |

OTHER PUBLICATIONS

Leshed, et al.; "CoScripter: Automating and Sharing How-To-Knowledge in the Enterprise"; Proceedings of CHI 2008, ACM; p. 1-10; 2008.

Li, et al.; "Here's What I Did: Sharing and Reusing Web Activity with ActionShot"; Proceedings of CHI 2010, ACM; p. 1-10; 2010.

Mahmud, et al.; "Lowering the barrier to website testing using CoTester"; IUI 2010, ACM; p. 1-10; 2010.

Zain, et al.; "Using aesthetic measurement application (AMA) to measure aesthetics of Web page interfaces"; Fourth International Conference on Natural Computation; p. 96-100; 2008.

Zhou, et al.; "Optimizing User Interaction for Web-based Mobile Tasks"; 2010 10th Annual International Symposium on Applications and the Internet; p. 68-76; 2010.

Nazemi, et al., "Interaction Analysis: an Algorithm for Interaction Prediction and Activity Recognition in Adaptive Systems," IEEE ICIS, IEEE International Conference on Intelligent Computing and Intelligent Systems (ICIS), 2010.

* cited by examiner

AUTOMATED WEB TASK PROCEDURES BASED ON AN ANALYSIS OF ACTIONS IN WEB BROWSING HISTORY LOGS

CROSS-REFERENCE TO RELATED APPLICATIONS

This application is a continuation of U.S. Non-Provisional application Ser. No. 13/222,083, entitled "AUTOMATED WEB TASK PROCEDURES BASED ON AN ANALYSIS OF ACTIONS IN WEB BROWSING HISTORY LOGS", filed Aug. 31, 2011 and abandoned on Oct. 2, 2014, which is incorporated herein by reference in its entirety.

BACKGROUND

Embodiments of the invention relate generally web applications, and more particularly, to generating automated web task procedures.

People often perform repeated web browsing tasks in websites, e.g., paying bills, booking flight tickets, or purchasing items from online vendors. Sometimes these tasks have many steps which are difficult to remember, specially if they are repeated infrequently. Web automation systems, such as the system described in the paper entitled "CoScripter: Automating and Sharing How-To Knowledge in the Enterprise," Proceedings of CHI 2008, ACM, New York, 2008, enable users to record and playback automated scripts, i.e., web procedures, for doing repeated tasks.

Such web automation systems may not be widely used because they require manual efforts to create and maintain automated scripts. In addition, a web script may not work after a period of time if the website that script tries to access has changed after the creation of the script.

BRIEF SUMMARY

Exemplary embodiments of the invention relate to analyzing user history logs to generate automated task procedures, for example, from web browsing logs to generate automated web task procedures. The exemplary embodiments of the invention may be implemented in a web browser or a database application, among other computer and data related applications.

One aspect of the invention concerns a system for generating automated web task procedures. The system may comprise a memory for storing a web log, and a processor coupled to the memory and configured to identify sequences of related web actions from the web log, group each set of similar web actions into an action class, and map the sequences of related web actions into corresponding sequences of action classes. The processor may be configured to cluster each set of similar sequences of action classes into a cluster, wherein relationships among the action classes in the cluster are represented by a state machine, and generate an automated web task procedure from the state machine.

The details of the preferred embodiments of the invention, both as to its structure and operation, are described below in the Detailed Description section in reference to the accompanying drawings. The Summary is intended to identify key features of the claimed subject matter, but it is not intended to be used to limit the scope of the claimed subject matter.

DETAILED DESCRIPTION

Figure 1:
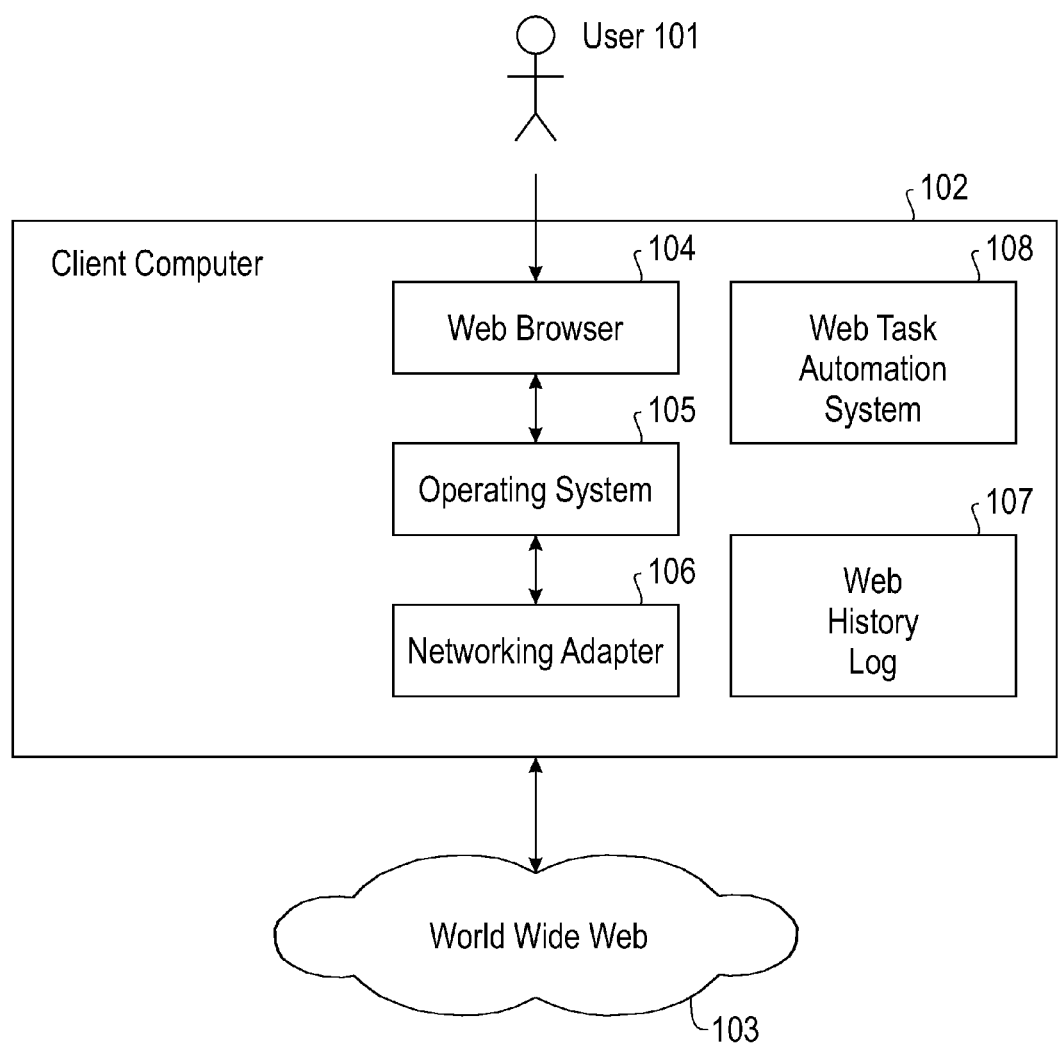
FIG. 1 illustrates an exemplary block diagram of software and hardware components in a computer system that a user may use to connect to the web and initiate web actions, according to an embodiment of the invention.

The invention relates to methods, systems, and computer program products for analyzing web browsing histories to generate automated web task procedures based on results of the analysis. For the purposes of explaining the invention, exemplary embodiments are described in the context of a web application, however, the embodiments are not limited only to a web application environment and may be applicable to other computer applications such as database, user interface, and communication devices and applications.

Web users generally find the creation of web scripts for repeated tasks requires too much effort or that the overhead for maintaining these web scripts, once created, to maintain them for continued operation is too high. For instance, some users may stop using the scripts that they previously created because the websites accessed by the scripts have changed since the creation of the scripts and now cause the scripts to fail. Manually created scripts require even higher overheads as a user may need to find the scripts stored in a library or another computer system, and then load them into a target system. As a result, users often spend a lot of time repeating previously performed web tasks and sometimes forget certain steps in the previous tasks. Such a repetition of web actions leads to delays and errors even though the repeated tasks may be simple.

An automated generation of web procedures could benefit a large number of web users. Once the automated web procedures are created, task procedures or sub-procedures could help users remember the procedures or sub-procedures when the users are in a particular situation, and remind the users to take the correct next steps to accomplish repeated tasks. Automated web task procedures thus help the users perform the repeated tasks with less errors and increase user productivity.

Automatic learning of web procedures from web interaction history further lowers the manual effort to create them. The users will be more receptive to web automation systems for performing repeated tasks. In addition, website administrators and web developers may use the automatically learned web procedures to generate test cases for a particular website.

Embodiments of the invention may automatically generate web task procedures for repeated tasks from web interaction histories. The embodiments may generate an executable instruction from each web interaction, group the set of such instructions per website, and learn a set of web procedures per website from the corresponding instructions of that website. Once web procedures are learned for each website browsed by a user, embodiments of the invention may identify and recommend relevant procedures and sub-procedures to the user when the user browses a website.

To learn the set of procedures for a website, embodiments of the invention may initially segment the set of web actions or instructions for that website into a set of sequences of web actions using a segmentation heuristic process. Each such set may contain one or more sequences of executable instructions or web actions. The embodiments may map each of the instructions into an abstracted instruction which is referred to as an instruction class or action class, and cluster the sequences of abstracted instructions so that each cluster contains a set of sequences instruction classes which share similar abstracted instructions.

Once the clustering of the action classes (or instruction classes) is completed, embodiments of the invention may create one or more web task procedures from each cluster by taking all of the sequences in that cluster using an automaton learning process. The generated web procedures correspond to an automaton or state machine.

Referring now to the drawings and in particular to FIG. 1, there is illustrated a block diagram of exemplary programs and hardware components in a computer system 102 that allows a user 101 to connect to the web 103 and initiate web actions while accessing various web sites on the web. The operation of the hardware and software components in client computer 102 is typically managed by an operating system 105. One of such software applications may be a web browser 104 through which the user 101 interacts with web hosting applications on the web 103. The client computer 102 may include a network adapter 106, which may comprise appropriate hardware and software elements, for accessing the web 103.

While the user 101 is interacting with a web site on the web 103, a browsing history recording feature, e.g., a plug-in utility, in the web browser 104 may be activated to record the user's interaction with the web. The browsing recording feature may store the recorded user web actions in a web log 107, for example, on the client computer 102. Alternatively, the web log 107 may reside on a web hosting server that the user 101 interacts with though the web 103.

In one exemplary embodiment of the invention, a web task automation system 108 may operate on the client computer 102 to provide automated web task procedures based on the user 101's past interactions with the web. The web task automation system 108 will now be described in detail with reference to FIGS. 2-8.

Figure 2:
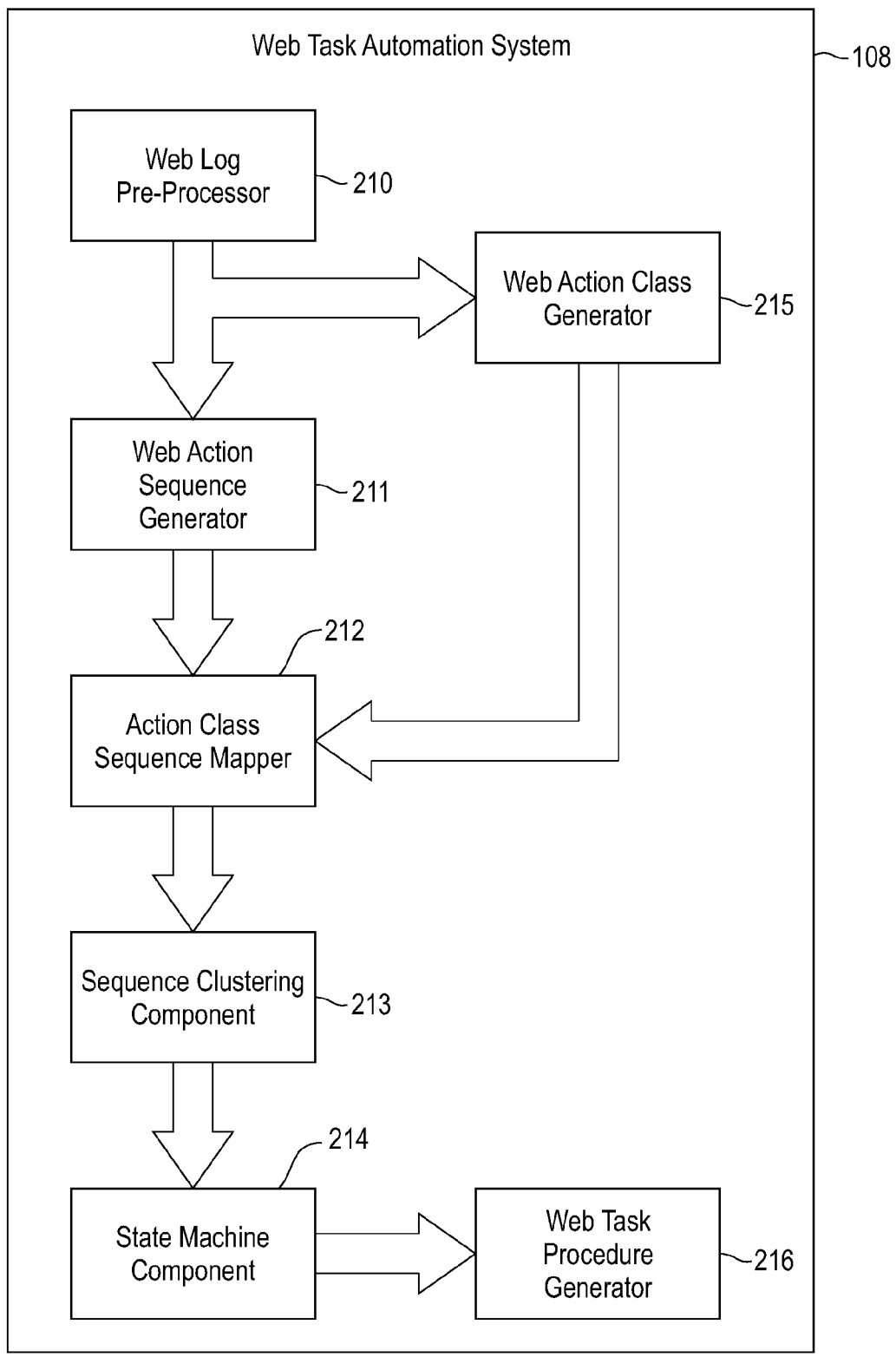
FIG. 2 illustrates an exemplary block diagram of a web task automation system to provide automated web task procedures based on an analysis of web browsing logs, according to an embodiment of the invention.

FIG. 2 illustrates an exemplary block diagram of a web task automation system 108 for generating automated web task procedures based on the user's past web interactions, according to an embodiment of the invention. At a high level, the web task automation system 108 may initially transform a web interaction log into a format suitable for detecting patterns of repeated web actions. The web task automation system 108 may detect sequences of related web actions from the web log and categorize functionally equivalent actions into action classes.

The web task automation system 108 may further map the web action sequences into sequences of action classes. The mapping from actions to action classes along with frequency counts of individual actions may be stored for online mapping and prediction. Segmenting and mapping are independent of each other and can be done in parallel. The web task automation system 108 may then cluster similar action class sequences together and build a finite state automaton for each cluster. The web task automation system 108 may generate automated web task procedures from the state machine as well as predicting a user's future web actions from the state machine.

Exemplary components in the web task automation system 108 in FIG. 2 are now described with reference the examples of web actions, intermediate data, and resulting automated web task procedures illustrated in FIGS. 3-5. The web task automation system 108 may comprise a web log pre-processor 210 for transforming input web log data into a form more suitable for pattern discovery.

In one embodiment, a web history log may be generated as a result of recording user interactions in websites using a web history recording tool such as the recording tool described in the paper entitled "Here's What I Did: Sharing and Reusing Web Activity with ActionShot," Proceedings of CHI 2010, ACM, 2010. In that case, the recorded steps contain an interaction with a web page item (e.g., clicking a button, entering a text into a textbox) or visiting to a website (e.g., going to a URL). A web log pre-precessor 210 may simply output the recorded interactions without any transformation.

In another embodiment, a web log may contain sequences of web page URLs, along with web pages that were visited, the type of web actions performed at each interaction, and an XPATH of a DOM tree node which was accessed at each step. Such web logs may be obtained by a browser plug-in which monitors user interactions in a website and records user interactions in the web log. For such a web log, a web log pre-processor 210 may output a step in the ClearScript language for each web interaction to the web history. An example of such a pre-processing output is described in the paper entitled "Lowering the barrier to website testing using CoTester", IUI 2010, ACM 2010.

To transform a recorded interaction in the web log to a target ClearScript step, the pre-processor 210 may need to find a label of an interacted web page element by visiting the DOM tree, apply the XPATH to find the target DOM node of the interacted element, and extract its label field from the identified DOM node. For each interacted element, the type of interaction may be recorded in the web log. So, for a given <action, object, label> interaction triple, the pre-processor 210 may generate a ClearScript statement using the grammar rules of the ClearScript language. For example, if the pre-processor 210 receives a <click, button, "submit">triple representing a web interaction, it may generate the statement "click the "submit" button" as a result.

Figure 3:
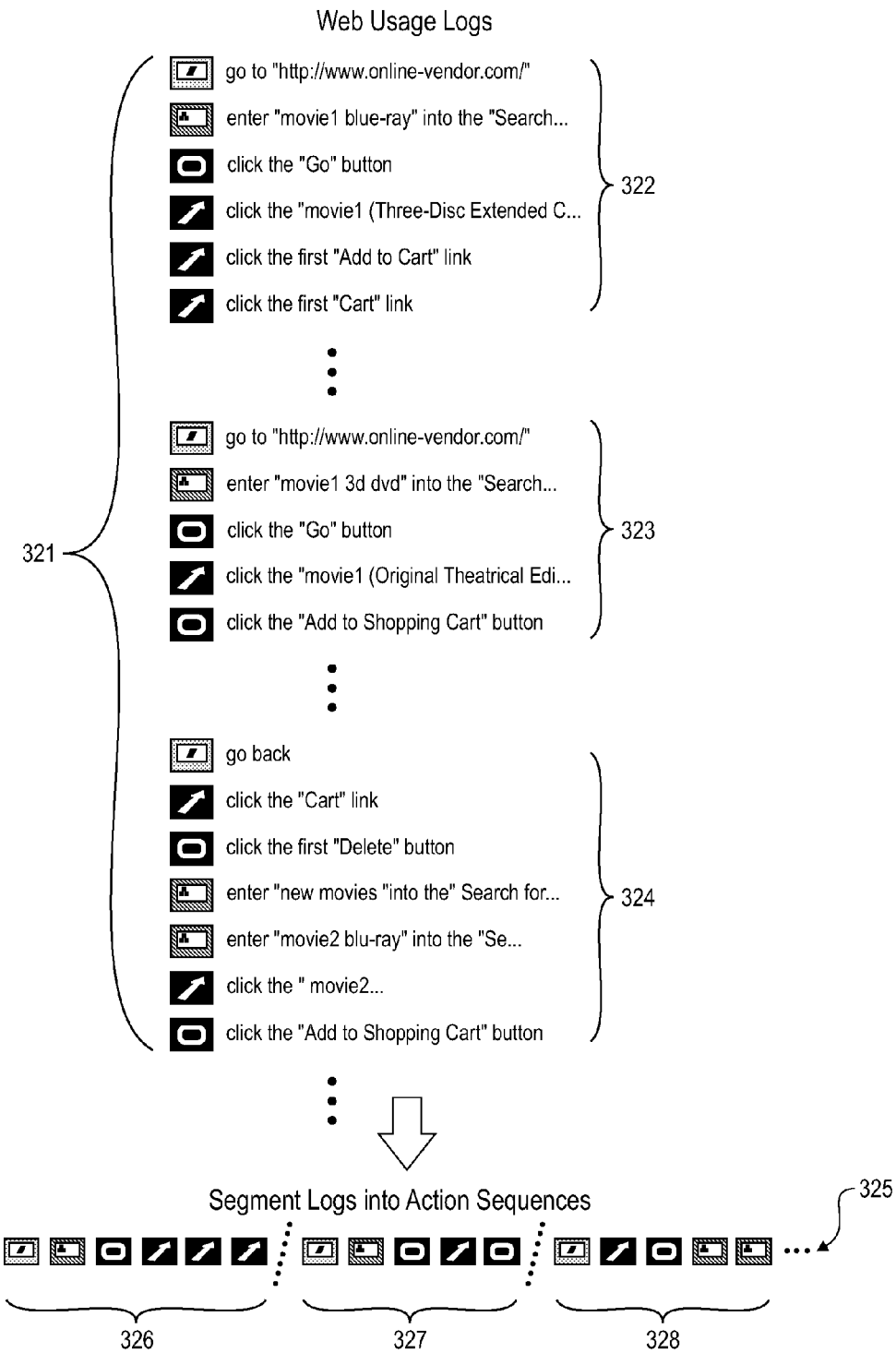
FIG. 3 illustrates an example of the segmentation of user web logs to identify sequences of related web actions, according to an embodiment of the invention.

The processed web log may be in the form of web log 321 in FIG. 3, which may include multiple groups 322-324 of web actions where each group comprises user actions that are related to a web transaction.

Once the history log of web actions is organized into a format more suitable for pattern detection, a web action sequence generator 211 of the web task automation system 108 may segment the web history log 321 into sequences of related web actions. For example, related web actions associated with an online purchase may include user clicks to open a web domain, search for a desired item, and add the item to a checkout cart, as illustrated below:

go to "http:\\www.-online-vendor.com/"
enter "movie1 blu-ray" into the "Search" field
click the "go" button
click the "Movie1 (Three-Disc Extended version)
click the first "Add to Cart" link
click the first "Cart" link The web actions in a web log may be recorded by a logging utility as a stream 322 of web actions from which the web task automation system 108 may segment into sequences 326-328 of web actions. Each of the sequences 326-328 consists of web actions pertaining to a particular web transaction, e.g., finding a particular online item and adding the item to a checkout cart. The segmentation of the web action stream 322 may include identifying overlaps within the sequences to determine the boundaries of sequences of related web actions. For example, repeated selections of the "Search" buttons may occur within sequences that start with user clicks to go to a web domain and end with user clicks to add an item to a "Checkout Cart".

To measure task repetition, the web task automation system 108 may estimate task boundaries within each user's log data in order to extract sequences of actions over which the system 108 could detect repeated tasks. For each domain, the web task automation system 108 may first segment the web logs per day (assuming that the web tasks did not span multiple days). The web task automation system 108 may then segment the logs within each day using a time-based heuristic as follows. The web task automation system 108 may compute the mean time between consecutive domain actions (excluding those spanning day boundaries), and then segment the logs when the time between consecutive actions exceeds one standard deviation of the mean.

Intuitively, the segmentation of the web log assumes that the time between consecutive actions within a task is less than the time between actions across task boundaries. The web task automation system 108 may remove sequences of two actions or less from a resulting set of sequences as these likely do not contain repetitious behavior and add noise.

Table 1 illustrates an example of actual web usage data for a group of users and the amount of repetition by each user. The web usage logs may be obtained through a browser plug-in that records web actions in a pseudo-natural language. The collected data for the example include 62,830 Web actions from 411 unique domains. To avoid the added complexity of distilling distinct tasks from actions collected over multiple tabs, the web task automation system 108 may limit the analysis of repetition to behaviors within a single domain, e.g., "www.-online-vendor.com".

TABLE 1

| PID | DAYS | ACTIONS | DOMAINS | SEQUENCES | AVERAGE SEQUENCE LENGTH |
|---|---|---|---|---|---|
| 1 | 271 | 27,538 | 109 | 1,557 | 11.4 |
| 2 | 141 | 19,371 | 128 | 1,377 | 10.4 |
| 3 | 61 | 4,472 | 69 | 367 | 10.8 |
| 4 | 42 | 6,393 | 66 | 435 | 9.0 |
| 5 | 24 | 490 | 5 | 38 | 16.0 |
| 6 | 21 | 2,958 | 9 | 63 | 31.7 |
| 7 | 21 | 1,371 | 25 | 105 | 10.5 |
| Total | 581 | 62,830 | 411 | 3,940 | NA |
| Avg. | 83 | 8,975.7 | 58.7 | 562.9 | 14.3 |
| SD | 93.1 | 10,444.1 | 48.3 | 638.1 | 8.0 |

The web task automation system 108 may include a web action class generator 215 for grouping each set of conceptually equivalent or similar web actions into a web action class. For example, the "Click the 'login' button" and "Click the 'Log-in' button" actions should be considered the same when measuring repetition. The web action class generator 215 may use a conservative method for mapping actions to action classes in order to preserve the underlying intention of the action taken (e.g., to insure that "Enter username" and "Enter password" are never mapped to the same class).

First, the web action class generator 215 may interpret each web action as a Web page command where each command contains three parts: an action type that indicates the interaction-level action taken, an object type that represents the type of page element on which the action was taken, and an object label that identifies the target element. For example, the "Click the 'login' button" action would be interpreted as the command: <'click','button','login'>.

Figure 4:
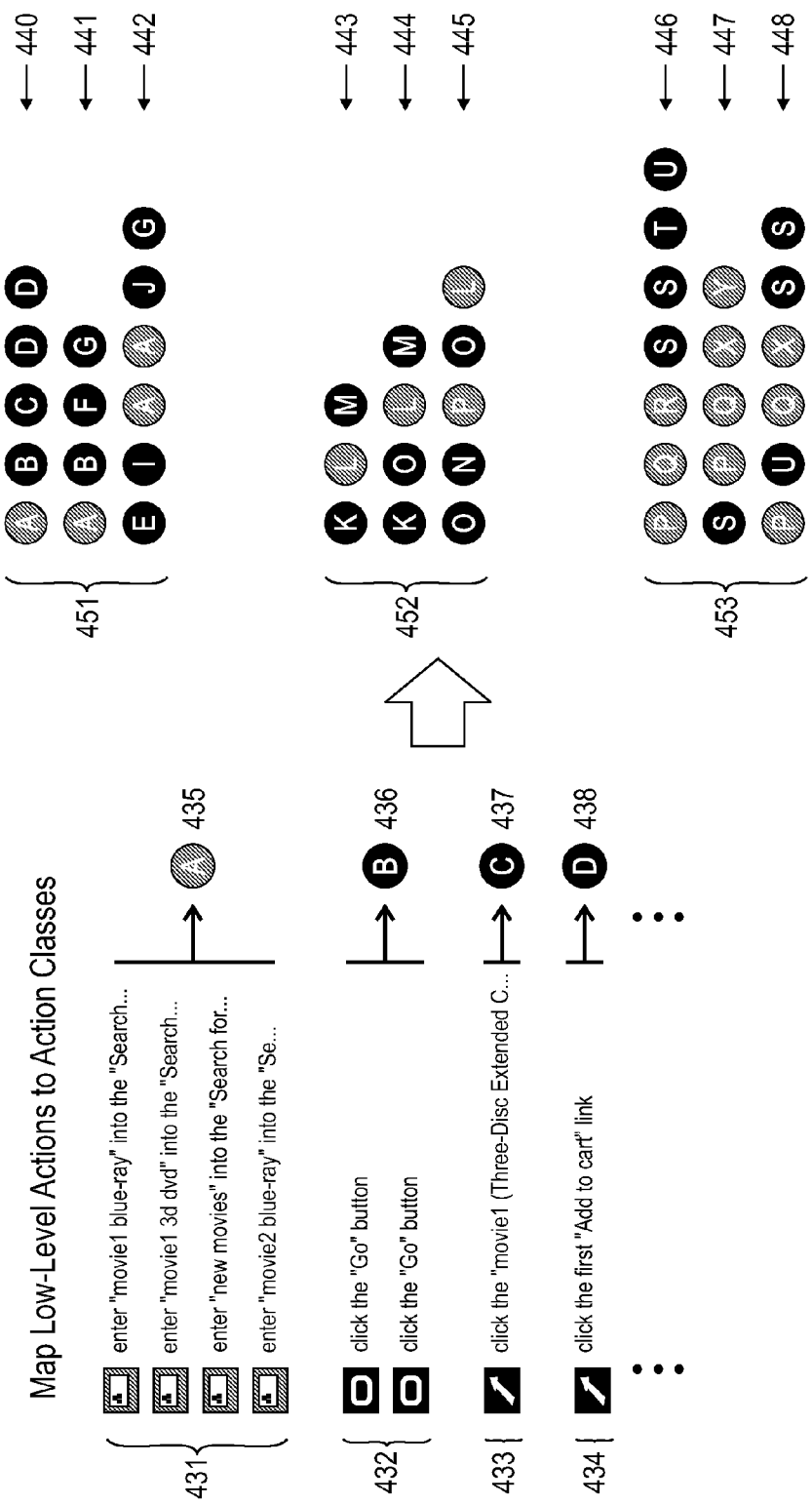
FIG. 4 illustrates examples of a mapping of low level web actions into web action classes and a clustering of sequences of the web action classes into clusters, according to an embodiment of the invention.
Figure 5:
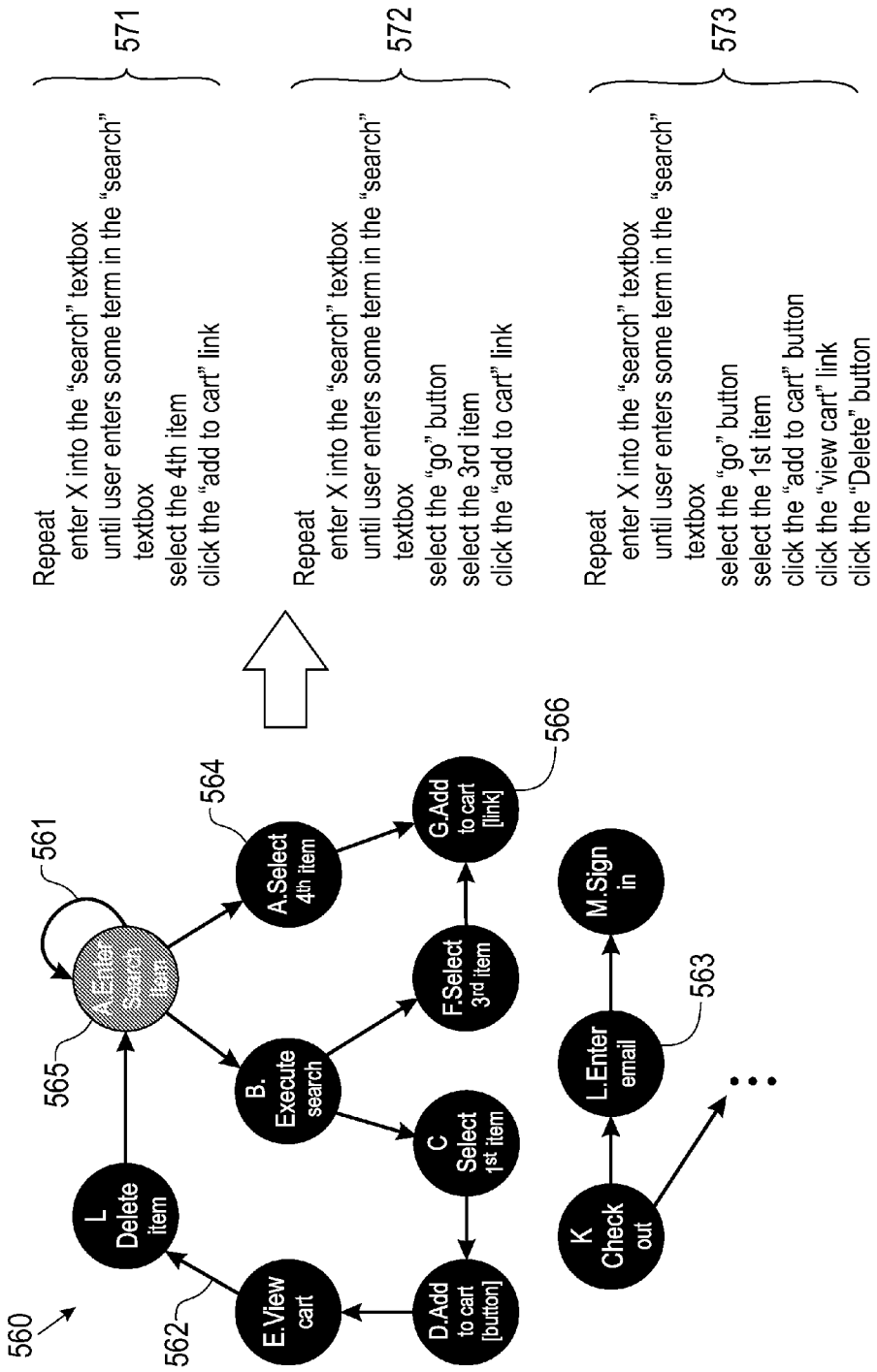
FIG. 5 illustrates a state machine that represents a cluster of action class sequences and examples of automated web procedures generated by a web task automation system from the state machine, according to an embodiment of the invention.

FIG. 4 illustrates an example of the grouping of functionally equivalent web actions into web action classes. The web actions 431 all concern searching for particular items by entering the names of the items in the search field of a web browser. These web actions may be grouped into action class A (435) which includes different forms of searching for the desired items. Similarly, other sets 432-434 of functionally equivalent web tasks may be grouped into action classes 436-438, respectively.

The web task automation system 108 may further comprise an action class sequence mapper 213 for mapping sequences of related web actions into sequences of web action classes as part of the generation of automated web task procedures. For each web action in an identified sequence of related web actions, the action class sequence mapper 213 replaces the web action with a corresponding action class, as previously determined by the web action class generator 215. For example, different user web actions may be transformed into corresponding action classes as illustrated in Table 2.

TABLE 2

| WEB ACTION | WEB ACTION CLASS |
|---|---|
| 1. Enter "movie1 blu-ray" into the "Search" field | Action Class A (Enter search term) |
| 2. Click the "Go" button | Action Class B (Execute Search) |
| 3. Click "Movie1 3-disc Set" | Action Class C (Select First Item) |
| 4. Click the "Add to Cart" link | Action Class D (Add to Cart button) |
| 5. Click the "Cart" link | Action Class D (Add to Cart button) |

In one embodiment of the invention, an action class sequence mapper 213 may map web commands to action classes sequentially as web commands are initiated. That is, an incoming command is mapped to an existing action class (that possibly contains multiple commands) if the command meets the following criteria:

The action type and object type of the incoming command are the same as that of the action class.

The difference between the object label of the incoming command and any command in the class is less than some threshold, where the difference is measured as a string edit distance between labels. Data collected from experiments show that an edit distance threshold of three is sufficient for achieving the goal of conservatively mapping similar actions together.

If no such class existed, the web action class generator 215 may create a new action class for the incoming command. FIG. 4 illustrates example sequences 440-442, 443-445, and 446-448 of action classes that were mapped from the sequences of related web actions, as identified from a web log. In the illustrated example, the web actions in each sequence of related actions are replaced by the corresponding action classes, as determined by the web action class generator 215, to form sequences of action classes 440-448.

To create models of repetitious behavior, the web task automation system 108 may include a sequence clustering component 213 to identify web behaviors that are similar. The sequence clustering component 213 may consider a measurement of repetition in web action sequences in order to group similar web action class sequences 440-448 together. In one embodiment, the sequence clustering component 213 may employ an unsupervised clustering process for grouping similar action class sequences together using a Longest Common Subsequence" (LCS) similarity metric.

The sequence clustering component 213 may use a set of web action class sequences 440-448 as input and construct a separate cluster for each set initially. The sequence clustering component 213 may then iteratively compute similarity between pairs of clusters, merge the most similar clusters together, eliminate low quality clusters and return the set of clusters with the highest quality. Since clusters may contain more than one sequence, cluster similarity is defined as the average similarity between the two corresponding sets of sequences, where sequence similarity is measured using normalized LCS metrics.

After clustering the sequences 440-448 of action classes, the sequence clustering component 213 may further optimize the resulting clusters by removing noisy clusters which contain either a single sequence or sequences with low intra-cluster similarity, using a similarity threshold. In one embodiment, a similarity threshold of 0.1 may be used for the cluster optimization. This threshold was determined from empirical web browsing data. FIG. 4 illustrates an example clustering of the action class sequences in which similar sequences 440, 441, and 442 are grouped into a first cluster 451. Similar sequences 443, 444, and 445 are in a second cluster 452, and similar sequences 446, 447, and 448 are in a third cluster 453.

Once the similar sequences of action classes are clustered and optimized, the sequence clustering component 213 may construct a state machine (i.e., an automaton) for each resulting cluster using an automata construction process. FIG. 5 illustrates such a state machine 560 for one of the clusters, using the example web log analysis shown in FIGS. 3 and 4. The state machine 560 includes states (e.g., 563, 564) and transitions (e.g., 561, 562) between the states.

The state machines for the resulting clusters may be generalized using heuristics specific to a user application. The construction of each state machine may begin with a cluster 451-453 of the action class sequences. A state machine component 214 may initially build a state machine 560 containing a linear path for each input sequence. A path represents a sequence of states (e.g., 563-564) and each state corresponds to one action class from the sequence. To generalize this state machine, the state machine component 214 may merge states using three heuristics:

Two states are merged if they are adjacent and contain the same action class. This is motivated by the assumption that if a user repeats an action once, the user may repeat it again later. After this merge, a self loop is created on the merged state. For example, the self loop 561 on state A ("Enter search term", 565) in FIG. 6 was created as a result of state merging using this heuristic.

Two states are merged if they contain the same action class and have similar next-state transitions. This captures the behavior of performing the same action after related actions. For example, in an e-commerce website, a user may add an item to a shopping cart after either searching for an item and then selecting a result from the search results list or choosing an item category and then selecting an item from the item list. Hence, states in a state machine which represent selecting an item followed by adding that item to a shopping cart should be equivalent.

Two states are merged if they contain the same action class and are reachable from similar predecessor states. For example, a person may select an item from a list to view its details, add that item to their shopping cart and either continue shopping or check out. That is, even though a person could perform different actions after adding an item to their shopping cart, the predecessor actions of adding an item to the cart are the same and therefore should correspond to the same state.

From the state machine 560 that represents a cluster of similar sequences of action classes, an automated web task generator 216 may generate automated web task procedures 571-573 for the web actions performed in the cluster. In one embodiment, the automated web task procedures 571-573 may be in the ClearScript language and executable by the CoScripter web automation system.

Figure 6:
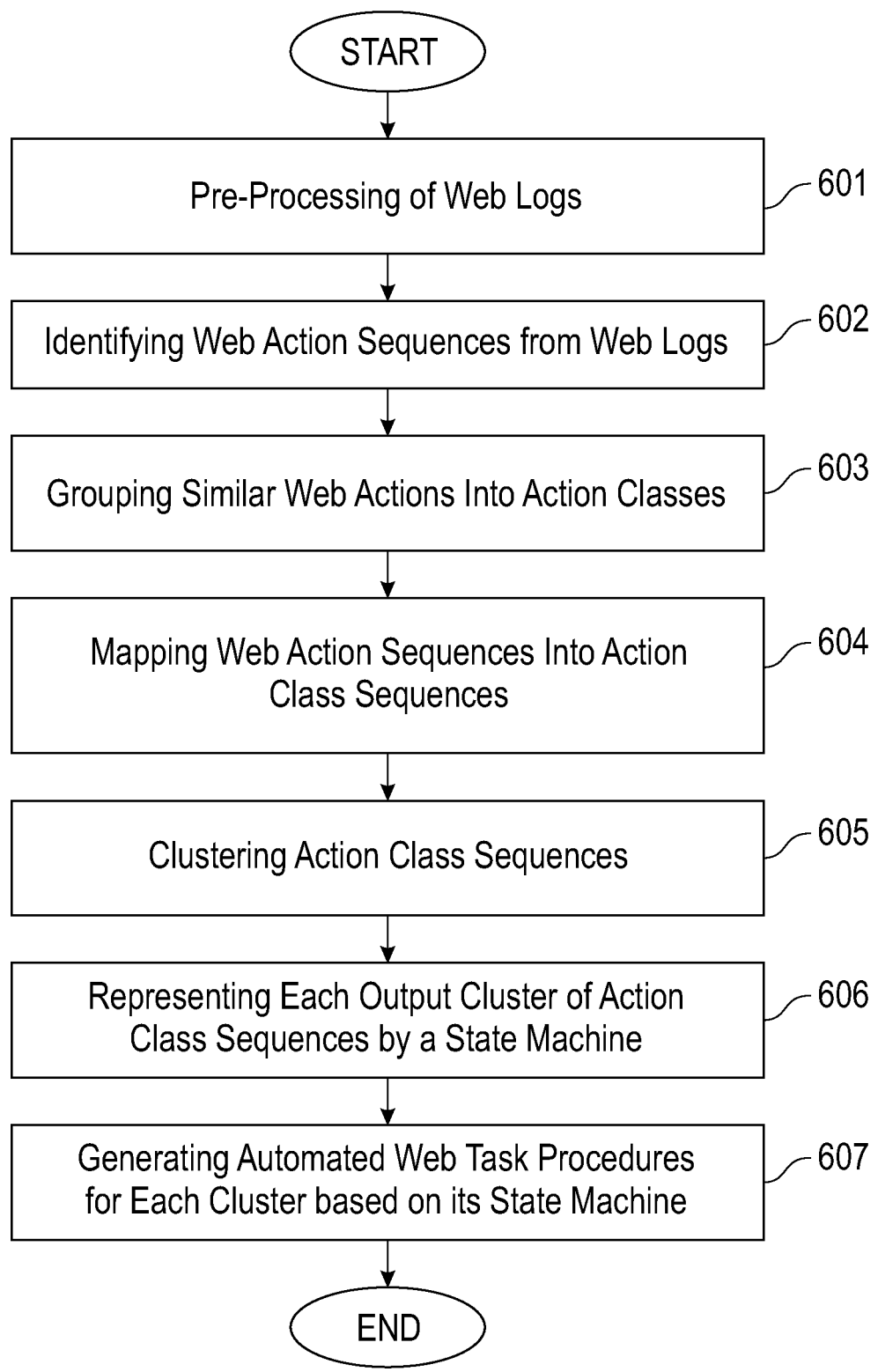
FIG. 6 is a flow chart of an exemplary process for generating automated web task procedures from web history logs, according to an embodiment of the invention.

To illustrate how a web task procedure may be generated from the state machine, consider the web task procedure 571 in FIG. 6. The first step of the procedure 571 is "Enter X into the search textbox". This first step in the procedure 571 is generated by state A (565) of the state machine 560. The state A (565) corresponds to action class A (565), which was a mapping of the web actions which entered search terms in a "search" textbox. To generate the first step of the procedure 571, a reverse mapping is applied which outputs "Enter X into the search textbox", where X is a variable which denotes the user input which a user would enter into the textbox. The first step of the procedure 571 is enclosed by a repeat block (i.e., enter X into the "search" textbox until user enters some term in the "search" textbox), which corresponds to loop 561 for state A (565) of the state machine 560.

After the repeat block, the second step of the procedure (select the $4^{th}$ item) is generated by visiting state J (564, for "select $4^{th}$ item") from state A (565), and then applying reverse mapping, i.e., a mapping of an action class to a web action. The final step of the procedure (click the "add to cart" link) is generated by visiting state G (566) from state J (564) and then applying a mapping from an action class to a web action.

FIG. 6 is a flow chart of an exemplary process for analyzing a web history log to generate automated web task procedures, according to an embodiment of the invention. The process may begin at step 601 in which a web log pre-processor 210 in a web task automation system 108 may convert the web history log into a form that is more suitable for detecting patterns of actions in the web log, as described with reference to FIGS. 3-4. In one embodiment, this pre-processing may include detecting an interacted web object using XPATH and a DOM tree for each step of the web log, identifying the object label, forming the triple <action, object, label> for the interaction, and generating a ClearScript statement from this triple using the grammar rules in the ClearScript language.

In another embodiment, the web interactions in a web history log may be recorded using a browser plug-in which outputs each step of interaction in a language executable by web automation systems such as CoScripter. In that case, the pre-processing step may simply pass the recorded web actions to the next step in the processing of the web log.

The web task automation system 108 then analyzes the web log to identify sequences of related web actions from the web log at step 602, for example, using a web action sequence generator 211. An action class generator 215 may be used for grouping each set of functionally equivalent web actions into an action class at step 603. Functionally equivalent web actions are those that have different names but essentially perform the same task. For example, all user selections such as "Add to Cart", "Add to Checkout Basket", and "Purchase Item" will functionally put an item that a user is interested into an area where the user would pay for in order to complete the online purchase of the item.

An action class sequence mapper 212 in the web task automation system may map the identified sequences 326-328 of related web actions into sequences of web action classes 440-448, at step 604. In an embodiment, each web action in a web action sequence is replaced with a web action class that corresponds to this web action, as generated in step 603. An action class clustering component 213 in the web task automation system may apply a clustering process to the resulting sequences of class actions, at step 605, to form distinct clusters of web activities. The clustering process may be an unsupervised clustering process for grouping similar action class sequences together using a Longest Common Subsequence" (LCS) similarity metric.

At step 606, a state machine component 214 may represent each output cluster of web activities by a state machine 560 (i.e., an automaton) as described with reference to FIG. 5. Using the state machine for each cluster, an automated web task procedure generator 216 in the web task automation system may generate one or more automated web task procedures 565-567 for web actions in the cluster, per step 607.

Figure 7:
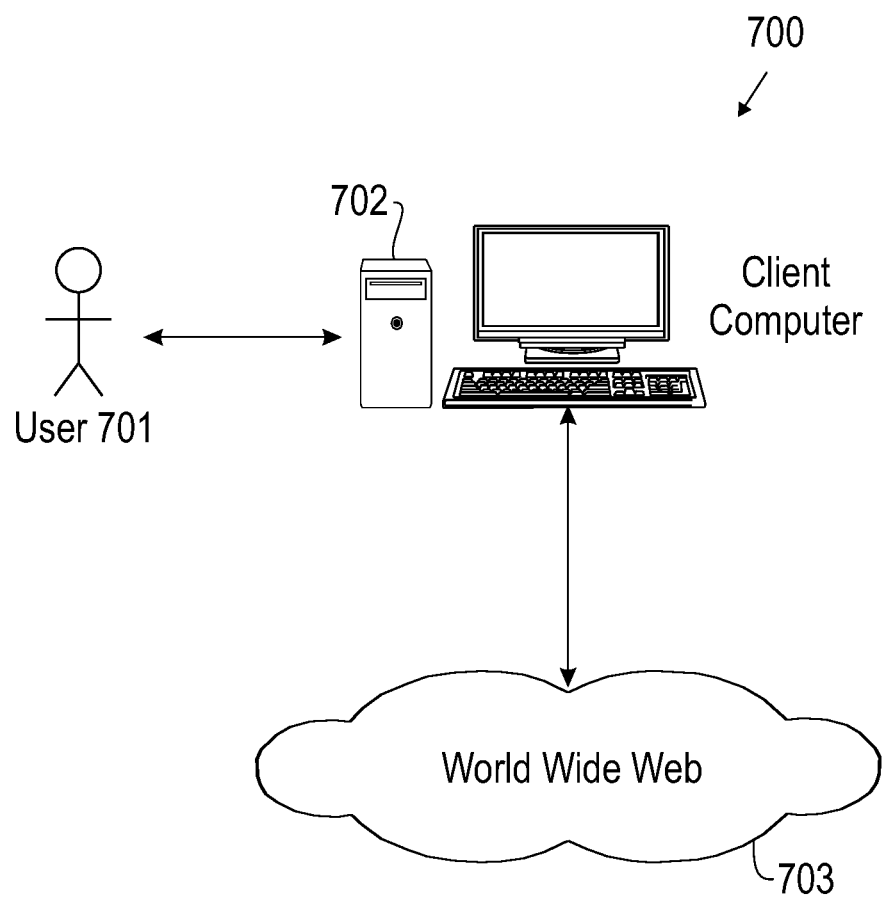
FIG. 7 illustrates a web application environment in which aspects of the invention may be implemented, according to an embodiment of the invention.

FIG. 7 illustrates a web application environment 700 in which aspects of the invention may be implemented. As an example, a user 701 may access the World Wide Web 703 through a client computer 702 that is connected to the web by a computer network. In a typical web browsing session, the user 701 may use a web browser application running on client computer 702 to visit web sites of interest, for example, to purchase goods from online vendors. Some of the user's web interactions may be repeated actions that the user 701 has performed in previous web browsing sessions.

As an example, the user 701 might have accessed an online commerce web site a week ago to search for a particular book and then ordered this book. The user 701 now returns to the same online web site to find a particular movie DVD set. The user's web actions may be recorded in a web browsing history maintained by the web browser if the web history recording function is activated in the browser, as illustrated in FIG. 1.

The subject matter described above is provided by way of illustration only and should not be construed as limiting. Various modifications and substitutions of the described components and operations can be made by those skilled in the art without departing from the spirit and scope of the present invention defined in the following claims, the scope of which is to be accorded the broadest interpretation so as to encompass such modifications and equivalent structures. For example, audio, text, spreadsheets, and databases could be encapsulated with metadata. Such audio may include information on heart murmurs. Text could include patient medical records and financial. Spreadsheets and databases may include company or hospital-wide activities. As will be appreciated by those skilled in the art, the systems, methods, and procedures described herein can be embodied in a programmable computer, computer executable software, or digital circuitry. The software can be stored on computer readable media. For example, computer readable media can include a floppy disk, RAM, ROM, hard disk, removable media, flash memory, a "memory stick", optical media, magneto-optical media, CD-ROM, etc.

As will be appreciated by one skilled in the art, aspects of the present invention may be embodied as a method, system or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "component" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN), a wide area network (WAN), Ethernet, SCSI, iSCSI, Fibre Channel, Fibre Channel over Ethernet, and Infiniband, or the connection may be made to an external computer, for example, through the Internet using an Internet Service Provider.

Aspects of the present invention are described above with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Figure 8:
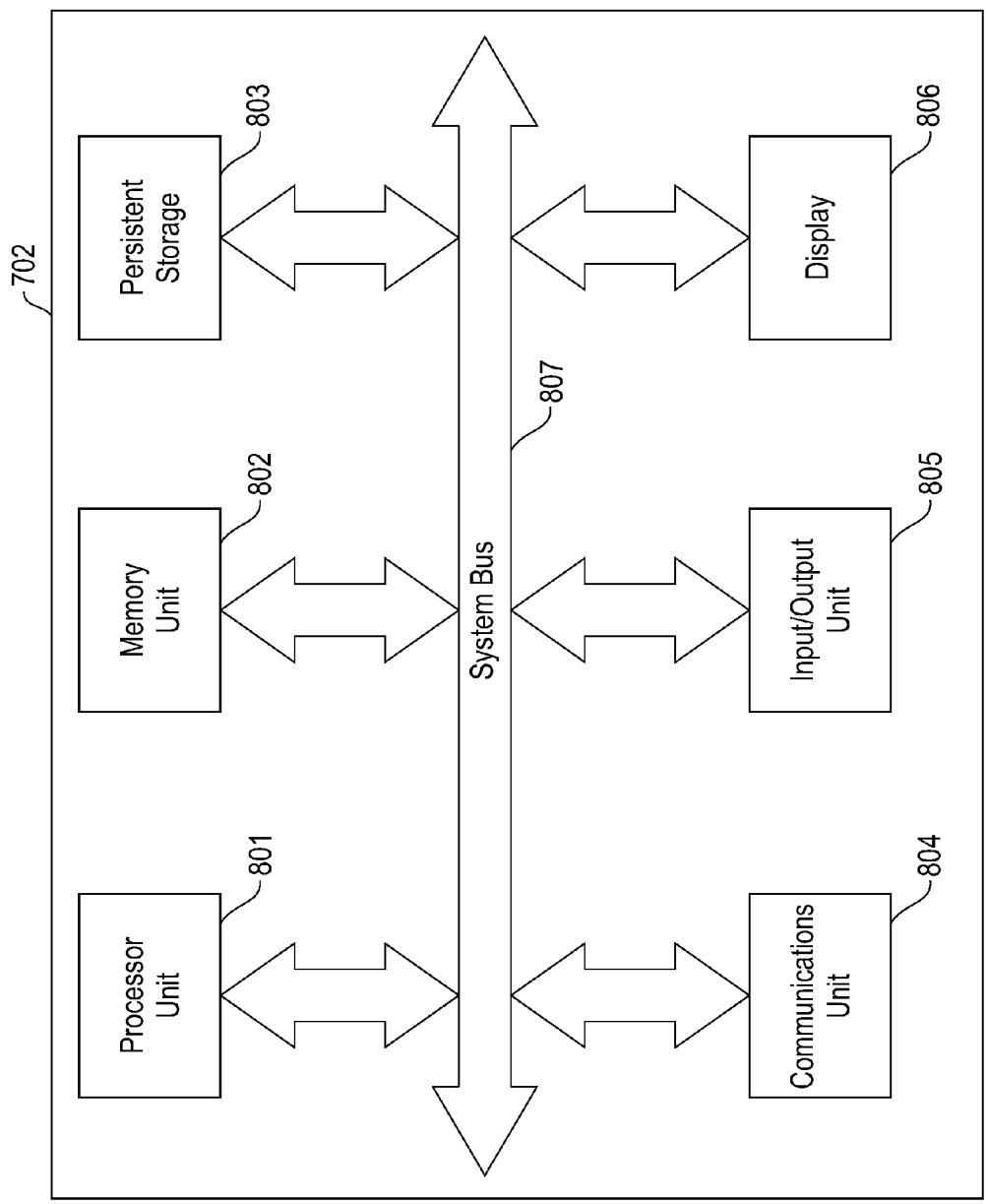
FIG. 8 illustrates an exemplary block diagram of a representative computer for providing automated web task procedures based on an analysis of web history logs, according to an embodiment of the invention.

FIG. 8 illustrates an exemplary block diagram of a representative computer which may be incorporated in a client computer 702. Computer system 702 may include a processor unit 801, a memory unit 802, a persistent storage 803, a communications unit 804, an input/output unit 805, a display 806 and a system bus 807. Computer programs are typically stored in persistent storage 803 until they are needed for execution by an operating system, at which time the programs are brought into the memory unit 802 so that they can be directly accessed by the processor unit 801.

The processor unit 801 selects a part of memory unit 802 to read and/or write by using an address that the processor 801 gives to memory 802 along with a request to read and/or write. Usually, the reading and interpretation of an encoded instruction at an address causes the processor 801 to fetch a subsequent instruction, either at a subsequent address or some other address. The processor unit 801, memory unit 802, persistent storage 803, communications unit 804, input/output unit 805, and display 806 interface with each other through the system bus 807.

The flowchart and block diagrams in the figures described above illustrate the architecture, functionality, and operation of possible implementations of systems, methods and computer program products according to various embodiments of the present invention. In this regard, each block in the flowchart or block diagrams may represent a component, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

What is claimed is:

1. A system comprising:
a memory for storing a web log comprising a plurality of sequences of web actions; and
a processor coupled to the memory and configured for:
constructing, based on the web log, a plurality of sequences of related web actions directed toward web transactions, wherein the related web actions in each sequence are directed to an associated web transaction for the sequence, and wherein the constructing comprises:
recording a stream of two or more web actions;
identifying one or more repetitions within the stream to determine a plurality of boundaries of the plurality of sequences of related web actions; and
segmenting the stream into the plurality of sequences of related web actions based on the identifying the one or more repetitions;
grouping each set of similar web actions into an action class;
mapping the plurality of sequences of related web actions into corresponding sequences of action classes;
clustering each set of similar sequences of action classes into a cluster, wherein the action classes in the cluster are represented by a state machine, the state machine comprising:
a plurality of states, each state representing a corresponding action class; and
a plurality of transitions between pairs of the plurality of states;
wherein the plurality of states and the plurality of transitions together form a plurality of paths through the state machine, the plurality of paths comprising a path corresponding to each sequence of web actions in the plurality of sequences of web actions; and
generating an automated web task procedure from the state machine.

2. The system of claim 1, further comprising a preprocessor for converting the web log into a form suitable for pattern detection.

3. The system of claim 1, further comprising an action class sequence mapper for mapping the plurality of sequences of related web actions into corresponding sequences of action classes.

4. The system of claim 1, further comprising a sequence clustering component for clustering the sequences of action classes.

\* \* \* \* \*